UNITED STATES PATENT OFFICE.

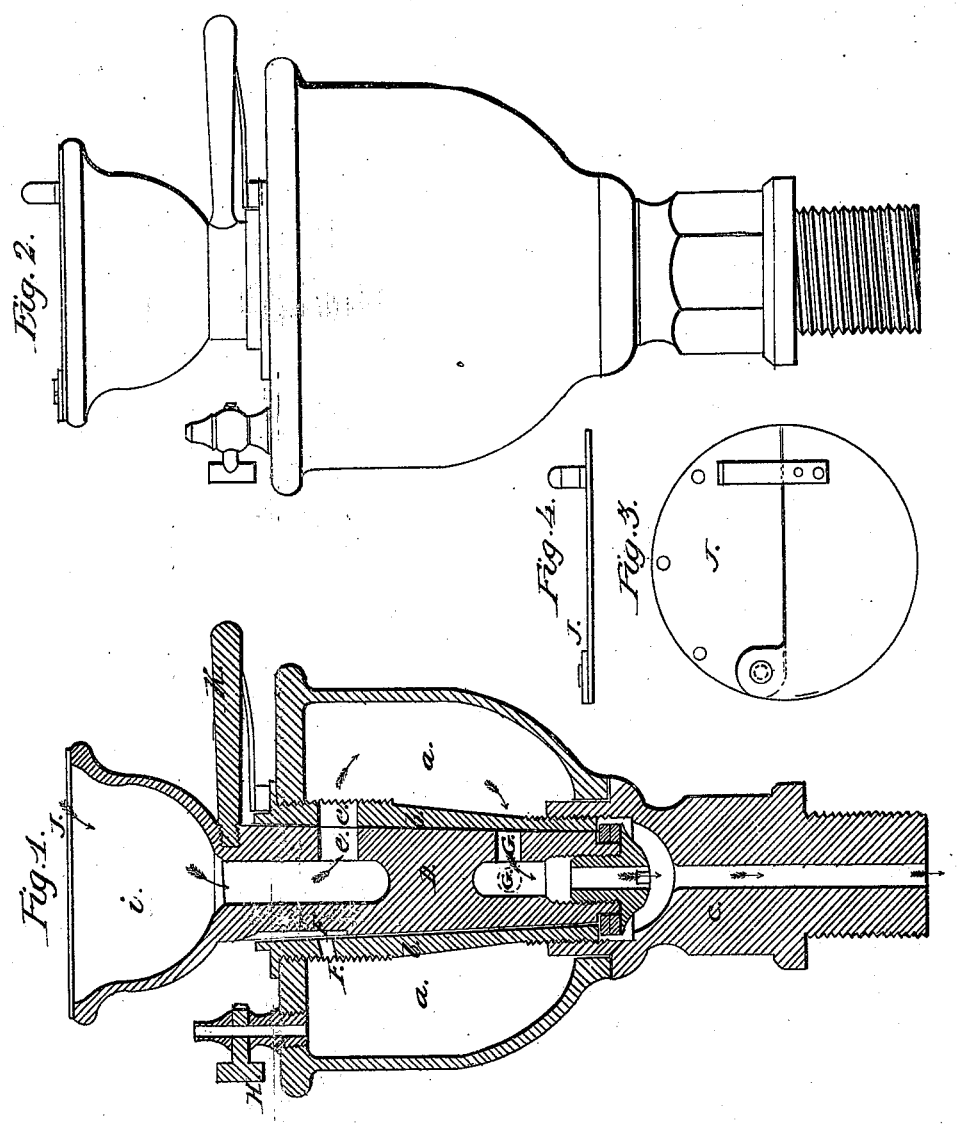

ROBERT AVIS COPELAND, OF BROOKLYN, NEW YORK.

IMPROVEMENT IN OIL AND TALLOW CUPS.

Specification forming part of Letters Patent No. 92,170, dated July 6, 1869; antedated June 22, 1869.

*To all whom it may concern:*

Be it known that I, ROBERT AVIS COPELAND, of the city of Brooklyn, county of Kings, and State of New York, have invented a new and Improved Method of Constructing Oil and Tallow Cups; and I do hereby declare that the following is a full and exact description thereof, reference being had to the accompanying drawings, and to the letters of reference marked thereon.

The nature of my invention consists, chiefly, in the manner of constructing and operating a plug or cock key in an oil or tallow cup, so arranged as to make its action uniform, and to obviate the necessity of renewing screw-caps, plugs, &c., and the use of stuffing-boxes.

To enable others skilled in the art to make and use my improvement, I will proceed to describe its construction and operation.

Figure 1 represents a longitudinal section. Fig. 2 represents a perspective view. Figs. 3 and 4 are two views of a cover for the top.

$a\ a$, Fig. 1, is the cup. $b\ b$ is a thimble or ferrule, screwed into the cup at the top and onto the base or stem $c$ at the bottom, making a joint at both extremities of the cup $a\ a$. D is a cock-key, fitted steam-tight into and secured by means of a nut and washer at the bottom of $b\ b$. E E are passages for filling the cup when the key D is turned or revolved to the position shown in the drawing. F is a vent or air-passage, which opens and closes with the passage E E. G G are the discharge or feed openings, which are shown closed or at right angles with each other in the drawing. H is a vent-cock to admit air when a greater feed is required. I is a semi-globular bowl, (part of plug D,) provided with a cover, J, to keep out dust and dirt, one side of which is stationary, and the other arranged so as to be easily opened for filling the cup. K is a handle attached to D, and provided with a spring, which works in notches cut into the flange on $b$, for the purpose of showing when the communications at the top or bottom are closed, and to also regulate the amount of opening at the bottom.

By revolving the plug $b$ to the farthest notch to the right, as shown in the drawing, the filling-passages are open, or opposite each other, and the discharge or feed passages are closed, or at right angles with each other, and by turning the plug to the extreme notch to the left the top passages are closed and the bottom are open. The regulating-notches for the feed are between the center of the extreme notches and the farthest notch to the right.

What I claim as my invention, and desire to secure by Letters Patent, is—

1. An oil or tallow cup with a tapering plug or key similar to those used in cocks, being fitted tightly by the ordinary method, and secured on the inside by means of a nut and washer, substantially as shown and described.

2. The thimble or ferrule $b$, the plug D, the cover J, handle and spring K, air-cock H, provided with the bowl $i$, openings E E and G G, and the base or stem piece $c$, in combination with an oil or tallow cup, substantially as and for the purpose set forth.

ROBERT AVIS COPELAND.

Witnesses:
 WM. E. MALI,
 T. A. QUINLAN.